Figure 1:
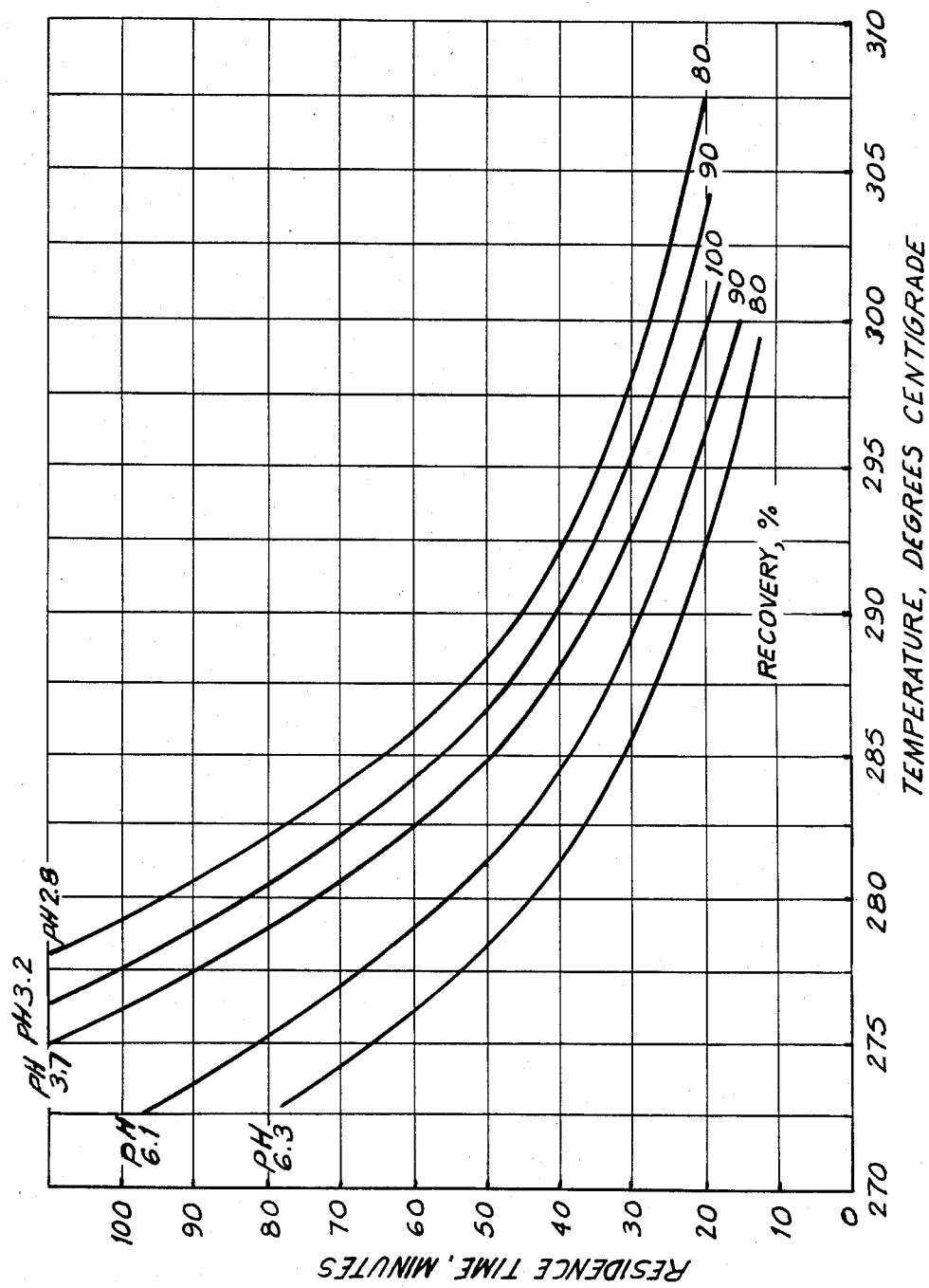

United States Patent [19]

Carpenter et al.

[11] Patent Number: 4,504,461
[45] Date of Patent: Mar. 12, 1985

[54] PROCESS FOR PRODUCING AMMONIUM METATUNGSTATE

[75] Inventors: Kent H. Carpenter, Ann Arbor, Mich.; John M. Laferty, Wheat Ridge, Colo.

[73] Assignee: Amax Inc., Greenwich, Conn.

[21] Appl. No.: 528,885

[22] Filed: Sep. 2, 1983

[51] Int. Cl.³ .............................. C01G 41/00
[52] U.S. Cl. ................................... 423/593
[58] Field of Search ......................... 423/593

[56] References Cited

U.S. PATENT DOCUMENTS

| | | | |
|---|---|---|---|
| 3,175,881 | 3/1965 | Chiola et al. | 423/593 |
| 3,304,249 | 2/1967 | Katz | 423/DIG. 16 |
| 3,451,764 | 6/1969 | MacWilliams et al. | 423/593 |
| 3,591,331 | 7/1971 | Chiola et al. | 423/593 |
| 3,857,928 | 12/1974 | Kim et al. | 423/593 |
| 3,936,362 | 2/1976 | Vanderpool et al. | 423/593 |
| 4,080,421 | 3/1978 | Kasserra | 423/593 |
| 4,083,922 | 4/1978 | Kasserra | 423/593 |

Primary Examiner—John Dell
Assistant Examiner—Wayne A. Langel
Attorney, Agent, or Firm—Michael A. Ciomek; Eugene J. Kalil

[57] ABSTRACT

A process is provided for producing ammonium metatungstate comprising fluid bed roasting ammonium paratungstate at a temperature over the range of about 275° C. to 305° C. for a time at least sufficient to provide a roasted product in the form of a precursor of ammonium metatungstate, forming an aqueous slurry of the precursor and digesting the precursor at a pH of about 3 to 4 for a time at least sufficient to effect substantially complete dissolution of said precursor, filtering the digested slurry to produce a clear filtrate, and further processing the clear filtrate by evaporation to provide crystals of substantially pure ammonium metatungstate.

14 Claims, 2 Drawing Figures

PROCESS FOR PRODUCING AMMONIUM METATUNGSTATE

This invention relates to an improved method for producing ammonium metatungstate and, in particular, to a method for producing ammonium metatungstate from ammonium paratungstate.

BACKGROUND OF THE INVENTION

Tungsten, generally in the form of $WO_3$, has many uses. For example, substantially pure $WO_3$ is a useful starting material for producing tungsten powder by hydrogen reduction at elevated temperatures for ultimate use in powder metallurgy.

Tungsten oxide is also a useful component of catalysts for chemical reactions. In many instances, it is necessary to provide a water-soluble tungsten from which tungsten oxide (e.g., $WO_3$) is subsequently derived. For example, where a porous ceramic is used as a support for the catalyst, such as alumina, a powdered ceramic material (alumina) is slurried in a solution of ammonium metatungstate (AMT) and the slurry thereafter dried to provide a catalyst compound intimately disseminated throughout the carrier.

According to U.S. Pat. No. 3,175,881, methods have been proposed for producing ammonium metatungstate solutions by baking crystalline ammonium paratungstate (APT) at temperatures of the order of about 500° F. (260° C.) to drive off ammonia followed by dissolution of the baked product in water. The baking operation produces a certain amount of ammonium metatungsten which is water soluble. However, studies have indicated that the ammonium paratungstate is not wholly converted to the "meta" form at any particular temperature, nor after any particular baking time, in that degradation products, especially insoluble tungsten oxide ($WO_3$), are continuously formed during baking. Moreover, certain amounts of unconverted ammonium paratungstate remain with the baked product.

The aforementioned patent provides an improved process for producing ammonium metatungstate comprising calcining ammonium paratungstate to drive off ammonia and water vapor to form a precursor of ammonium metatungstate, dissolving the precursor in water, digesting and evaporating the resulting solution, and and thereafter crystallizing ammonium metatungstate from the solution.

The commercially available ammonium paratungstate employed in carrying out the patented process is designated as having the following accepted formula:

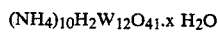

$(NH_4)_{10}H_2W_{12}O_{41} \cdot x\ H_2O$ where $x = 6$ to 28.

The patent states that small quantities of ammonium paratungstate may remain unconverted and that small amounts of tungsten oxide may also be produced.

The calcination, by way of example, is accomplished by heating the material in batches in trays or by feeding the material in a rotary type kiln. The temperatures employed may range from about 300° F. to 700° F. (about 150° C. to 370° C.), e.g. about 500° F. to 600° F. (about 260° C. to 315° C.).

The time to accomplish the desired degree of calcination may be varied substantially, for example, from about 4 hours to about 8 hours when the ammonium paratungstate is simply contained in stationary trays in a furnace. Typically the trays contain a volume of material to be calcined measuring about 30 inches by 15 inches by 1 inch deep. In the rotary calciner, lower residence times may be employed.

While various combinations of temperatures, residence times and techniques (e.g., apparatus) may be employed according to the patent, variations in the final product may still occur, such as incomplete calcination or over-calcination resulting in an excess of free tungsten oxide, etc., which can result in yield losses.

As a guide in carrying out the aforementioned process, the patent states that the calcined material is in the desired optimum condition for the dissolution step when an aqueous slurry containing about 9% by weight of the material exhibits a pH of about 3.5 to 4. The patent states that in carrying out the process, all of the calcined material does not dissolve and that the insoluble portion (i.e., tungsten oxide and any unconverted ammonium paratungstate) is permitted to remain in the water during the subsequent digestion and evaporation. Best results are indicated by incorporating from about 9% to 10% by weight of calcined material in water. In an example, a yield of about 78.1% was indicated. Such yields result in a large volume of difficult-to-filter residue.

It would be desirable to provide an improved process for insuring consistently a high conversion of ammonium paratungstate to ammonium metatungstate accompanied by high recovery efficiency.

OBJECTS OF THE INVENTION

It is thus an object of the invention to provide a process for obtaining improved conversion efficiencies in the conversion of ammonium paratungsten to ammonium metatungstate.

Another object of the invention is to provide a process for obtaining substantially pure ammonium metatungstate in crystalline form.

Figure 2:
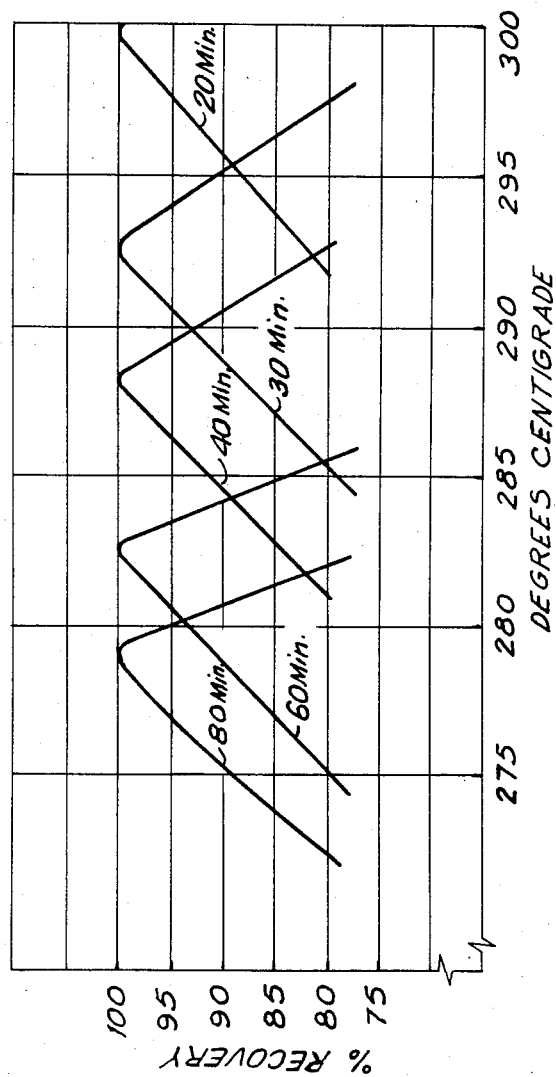

These and other objects will more clearly appear when taken in conjunction with the following disclosure, appended claims and the drawings, wherein:

FIG. 1 depicts a set of curves showing the effect of residence time and roasting temperature on the subsequent recovery of ammonium metatungstate during digestion in water; and FIG. 2 are curves derived from the curves of FIG. 1 showing percent recovery at constant roasting times at various roasting temperatures.

SUMMARY OF THE INVENTION

One embodiment of the invention resides in a process for producing ammonium metatungstate consisting essentially of fluid bed roasting ammonium paratungstate at a temperature over the range of about 275° C. to 305° C. for a time at least sufficient to provide an ammonium metatungstate "precursor" consisting essentially of an ammonium tungstate of an average ammonia to tungsten mole ratio of about 0.5, forming an aqueous slurry of the precursor and digesting the slurry at a pH of about 3 to 4 for a time at least sufficient to effect substantially complete dissolution of said contained precursor, filtering the digested slurry to produce a clear filtrate, and then further processing the filtrate by evaporation to provide crystals of substantially pure ammonium metatungstate.

The time at temperature may be relatively short and range from over 10 minutes to about 2 hours, for example, from about 15 to 100 minutes, e.g. about 20 to 60 minutes. In a preferred embodiment, the temperature may range from about 280° C. to 295° C.

Previous methods do not define the relationship between roasting time and temperature and, in fact, these methods usually indicate that tungstic acid and unconverted ammonium paratungstate generally result from roasting. Also, the digestion temperatures are specified as ranging from 70° C. to below the boiling point at slurry concentrations of 9 to 10% by weight.

On the other hand, the time-temperature relationship is such for fluid bed roasting that consistently high conversion is achieved. Moreover, it has been discovered how over/under roasting can be corrected during digestion at the relatively high slurry or pulp densities of about 10% to 35% by weight at digestion temperatures in the range of about 90° C. to the boiling point.

DETAILS OF THE INVENTION

In carrying out the invention, the ammonium paratungstate is roasted in air using a fluid-bed system, e.g. a fluid bed calciner, under carefully controlled conditions of temperature and residence times to produce the ammonium metatungstate precursor. Fluid-bed systems for this purpose are disclosed in the Chemical Engineers' Handbook by R. H. Perry and C. H. Chilton (Fifth Edition, McGraw-Hill Book Company, 1973).

The precursor, which has an average ammonia to tungsten mole ratio of about 0.5, is digested in an aqueous slurry at a concentration of about 25% contained $WO_3$ by weight at a pH of about 3.8 and a temperature of about 90° C. for about 2 hours. Solid ammonium metatungstate is recovered by crystallization or spray drying under conditions which avoid thermal degradation. The yield of tungsten as ammonium metatungstate is very high and is generally over 90%, e.g., in the neighborhood of about 99%.

Ammonium metatungstate is highly water soluble and is essentially free of alkali metal and other anion or cation impurities. A typical analysis is given below:

| Amount in ppm | | | | pH of Solution | |
|---|---|---|---|---|---|
| Na + K | Ca | S | Cl | 5% | 50% |
| <10 | <5 | <5 | <100 | 4.4 | 3.8 |

The maximum solubility of ammonium metatungstate is 265 grams/100 grams water which yields a solution containing about 53% tungsten by weight.

As illustrative of the interdependence of time and temperature on the yield of ammonium metatungstate, reference is made to FIG. 1. The ammonium paratungstate was fluid-bed roasted at the temperature and time indicated, the roasted product or precursor than slurried in water which resulted in a solution pH as indicated, and the yield following digestion determined.

As will be noted, at a roasting temperature of 285° C., the yield may vary from about 80% to 100% by changing the residence time of roasting from about 30 minutes to 60 minutes, the amount of roasted material or precursor digested in water corresponding to a slurry density of about 25% by weight contained $WO_3$. The pH of the 25% slurry changed from 6.3 at 30 minute residence time of roasting (at 285° C.) to pH 3.5 at a residence time of 60 minutes.

It has been observed that where the ammonium paratungstate is over calcined so as to yield an aqueous slurry of pH between about 2.5 to 3.5, particularly below 3, it may be corrected by adding ammonia to the slurry during the early period of digestion, for example, during the first 20 minutes of digestion.

Similarly, if the material is under calcined to yield a pH of about 4 to 7, i.e., over 4, the pH may be adjusted by added hydrogen ions to the slurry during the early period of digestion, e.g., during the first 20 minutes.

The desired optimum pH for a 25% slurry for achieving maximum yield of ammonium metatungstate is about 3.5 to 4. Correction in pH after the early period of digestion, for example, after the first 20 minutes, is not as effective for improving the yield of soluble tungsten.

Digestion may be accomplished in over 20 minutes and up to less than about 4 hours. Preferably, the digestion time may range up to about 90 or 120 minutes. If the slurry digestion (containing about less than 25% $WO_3$ by weight) is prolonged in time in excess of 4 hours, there is a tendency for tungsten to reprecipitate with a consequent reduction in yield. After filtration, the clear AMT filtrate is subjected to evaporation, such as by spray drying, to recover crystalline AMT under conditions such that the product temperature does not exceed about 105° C.

As illustrative of additional embodiments of the invention the following examples are given:

EXAMPLE 1

APT was calcined in a fluid-bed reactor at 283° C. for a residence time of about 60 minutes. The roasted product was then digested by adding 10 grams of calcine to 100 ml of water (i.e., 100 grams) for 20 minutes at the boiling point of the solution. The solution had a pH of 3.6. The recovery efficiency of soluble tungsten came to 99.7%. The solution was filtered and the clear filtrate spray-dried at 110° C. to obtain crystalline AMT containing 0.013% of insolubles by weight.

EXAMPLE 2

APT was calcined in a fluid bed reactor at a temperature of about 293° C. and a residence time of about 35 minutes. In digesting the calcine in water, 30 grams of the calcine was added to 100 ml of water (i.e., 100 grams). The slurry was digested for 10 minutes at 90° C., the resulting pH being 3.7. The tungsten recovery was 99.3%. The solution was further concentrated to a specific gravity of 1.4 by boiling. Following filtration, the clear filtrate was spray dried at 95° C. to obtain crystalline AMT containing only 0.009% insolubles.

FIG. 2, which is derived from FIG. 1, depicts a series of curves showing the temperature at which substantially 100% recovery is obtained at various residence times of roasting of 20, 30, 40, 60 and 80 minutes, respectively. The curves show the shorter the residence time, the greater the roasting temperature to achieve approximately 100% recovery. For example, at a residence time of 80 minutes, a roasting temperature of about 279° C. was indicated; whereas, at 20 minutes, the roasting temperature is indicated as 300° C.

As stated previously, the roasting residence time may range from over 10 minutes to about 2 hours over a temperature range of about 275° C. to 305° C.

Preferably, the roasting temperature may range from about 280° C. to 295° C. The residence time preferably ranges from about 15 minutes to 100 minutes, e.g., 20 to 60 minutes.

For consistent results with respect to high yields, it is preferred that the pH be controlled at about 3 to 4 and, more preferably, from about 3.5 to 4. The slurry concentration may range from about 10% to 35% of contained $WO_3$, by weight. The digestion period may range from about 30 minutes to not more than about 2 hours.

The temperature of the solution during digestion may range up to about the boiling point, e.g., from about 70° C. to the boiling point.

The evaporation of the clear filtrate is preferably accomplished by spray-drying, although other well known evaporation techniques can be employed. When using spray-drying, the product temperature should not exceed about 105° C.

Examples of spray-drying are given in U.S. Pat. Nos. 3,373,119 and 3,617,358.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for producing ammonium metatungstate which comprises, fluid bed roasting ammonium paratungstate at a temperature over the range of about 275° C. to 305° C. for a time inversely related to the temperature ranging from over about 10 minutes to about 2 hours and at least sufficient to provide a roasted product consisting essentially of an ammonium tungstate precursor of ammonium metatungstate capable of a conversion efficiency of over about 90% of said ammonium metatungstate, forming an aqueous slurry of said precursor and digesting said precursor at a pH of about 3 to 4 for a time at least sufficient to effect substantially complete dissolution of said precursor, filtering the digested slurry to produce a clear filtrate, and further processing said filtrate by evaporation to provide crystals of substantially pure ammonium metatungstate at a conversion efficiency of over about 90%.

2. The process of claim 1, wherein the aqueous slurry has a concentration corresponding to about 10% to 35% by weight of contained $WO_3$.

3. The process of claim 2, wherein the pH of the slurry ranges from about 3.5 to 4.

4. The process of claim 1, wherein the residence time ranges from about 15 minutes to 100 minutes.

5. The process of claim 4, wherein the residence time ranges from about 20 to 60 minutes.

6. The process of claim 1, wherein the roasting temperature ranges from about 280° C. to 295° C., wherein the pH of the slurry ranges from about 3.5 to 4 and wherein the slurry concentration corresponds to about 10% to 35% by weight of contained $WO_3$.

7. The process of claim 6, wherein the slurry is digested at a temperature ranging from about 70° C. to the boiling point of the aqueous slurry.

8. The process of claim 1, wherein the evaporation of the filtrate is achieved by spray-drying.

9. A process for producing ammonium metatungstate which comprises fluid bed roasting ammonium paratungstate at a temperature over the range of about 275° C. to 305° C. for a time inversely related to the temperature ranging from over about 10 minutes to about 2 hours and at least sufficient to provide a roasted product consisting essentially of an ammonium tungstate precursor of ammonium metatungstate capable of a conversion efficiency of over about 90% of said ammonium metatungstate, forming an aqueous slurry of said roasted product at a concentration corresponding to about 10% to 35% by weight of contained $WO_3$ and digesting said product at a pH of about 3 to 4 for a time at least sufficient to effect substantially complete dissolution of said precursor, filtering the digested slurry to produce a clear filtrate, and further processing said filtrate by evaporation to provide crystals of substantially pure ammonium metatungstate at a conversion efficiency of over about 90%.

10. The process of claim 9, wherein the pH of the slurry ranges from about 3.5 to 4.

11. The process of claim 9, wherein the pH is controlled during the early part of digestion by adding ammonium ions where the pH is below 3 or by adding hydrogen ions where the pH is in excess of 4.

12. The process of claim 9, wherein the time of roasting ranges from about 15 minutes to 100 minutes, and wherein the evaporation of the filtrate is achieved by spray drying.

13. The process of claim 12, wherein the time of roasting ranges from about 20 to 60 minutes.

14. The process of claim 9, wherein the roasting temperature ranges from about 280° C. to 295° C., wherein the pH of the slurry ranges from about 3.5 to 4 and wherein the slurry is digested at a temperature ranging from about 70° C. to the boiling point of aqueous slurry.

* * * * *